Sept. 8, 1953
O. J. WARREN ET AL
2,651,124
BOWL ADJUSTMENT FOR CARRY-TYPE SCRAPERS
Filed April 19, 1946
3 Sheets-Sheet 1
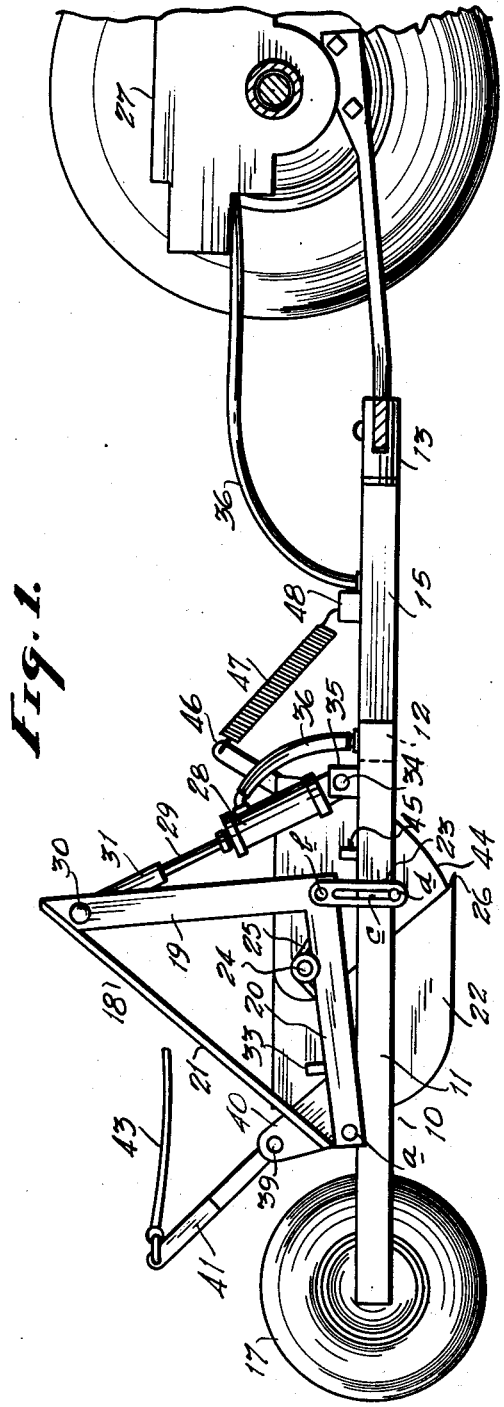
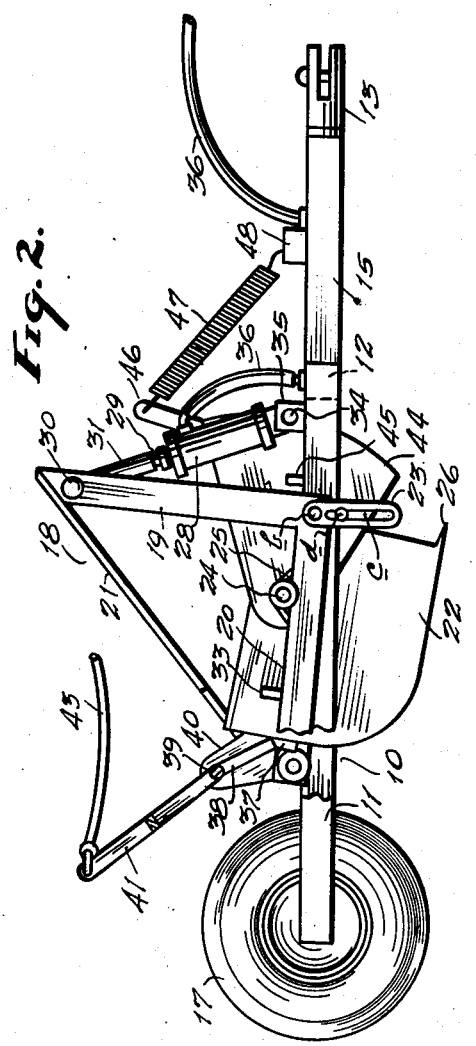
OTTO J. WARREN
V. W. HAIR
INVENTORS
BY Cecil L. Wood
ATTORNEY Sept. 8, 1953  O. J. WARREN ET AL  2,651,124
BOWL ADJUSTMENT FOR CARRY-TYPE SCRAPERS
Filed April 19, 1946  3 Sheets-Sheet 2
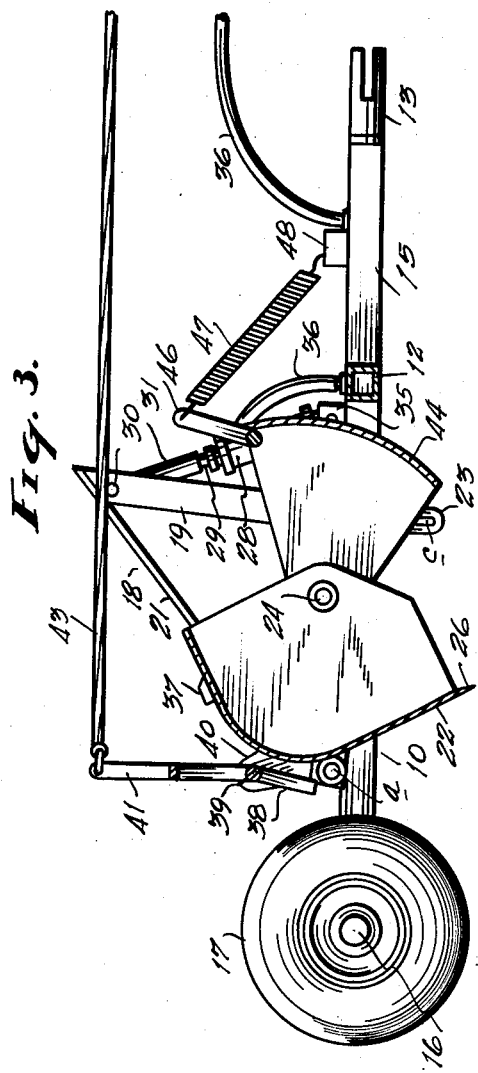
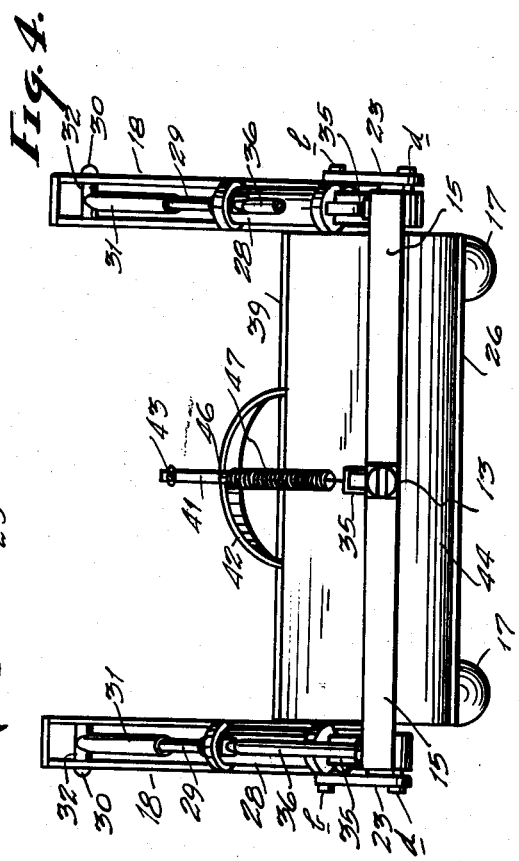
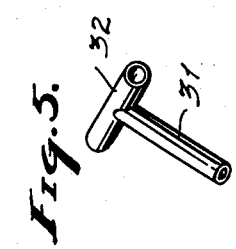
OTTO J. WARREN
V. W. HAIR
INVENTORS
BY Cecil L. Wood
ATTORNEY Sept. 8, 1953     O. J. WARREN ET AL     2,651,124
BOWL ADJUSTMENT FOR CARRY-TYPE SCRAPERS Filed April 19, 1946     3 Sheets-Sheet 3

OTTO J. WARREN
V. W. HAIR
INVENTORS

BY *Cecil P. Wood*

ATTORNEY

Patented Sept. 8, 1953

2,651,124

UNITED STATES PATENT OFFICE 2,651,124

BOWL ADJUSTMENT FOR CARRY-TYPE SCRAPERS

Otto J. Warren, Forth Worth, and Valton W. Hair, Dublin, Tex.

Application April 19, 1946, Serial No. 663,516

2 Claims. (Cl. 37—129)

This invention relates to earth moving devices and it has particular reference to tractor-drawn equipment of the type commonly referred to as a scoop, and its principal object resides in the provision of a wheeled structure capable of being drawn by and operated from any type of tractor equipped with an hydraulic mechanism with suitable controls by which the operator can manipulate the invention with greater efficiency and accomplish earth-moving tasks not ordinarily obtainable by the conventional type of scoop depending upon its own weight for its contact with the earth.

Another object of the invention resides in the provision of a compact and simple structure by which substantially large quantities of earth can be picked up or scraped from the earth's surface and carried relatively long distances and dumped with a minimum of effort on the part of the operator and expenditure of power from the tractor by which the invention is operated.

An object of the invention is to provide a pivotally suspended scoop in a wheeled frame structure and effect the engagement of the said scoop with the earth's surface through force applied by hydraulic pistons operated from the tractor drawing the invention, thus affording an implement suitably adapted to operate in substantially hard earth and thus be capable of excavation operations not ordinarily capable of accomplishment without first plowing or otherwise loosening the soil before scooping or picking up the same for removal.

Broadly, the invention seeks to comprehend the provision of an earth moving device which can be operated with maximum efficiency from a tractor, yet with a minimum of effort on the part of the operator, and to provide an implement capable of being attached to a draw-bar of any type of light tractor either of the wheeled or crawler type.

While the foregoing objects are paramount, other and lesser objects will become manifest as the description proceeds, taken in connection with the appended drawings, wherein:

Figure 1 illustrates the invention in side elevation and fragmentarily illustrates a tractor in vertical section by which the invention is drawn, the invention being shown in carrying position.

Figure 2 is a side elevational view of the invention showing the same in operative position in contact with the earth, a portion being cut away to illustrate the automatic latching device by which the scoop is retained in the carrying position shown in Figure 1 and by which the contents are dumped.

Figure 3 is a vertical sectional view of the invention taken on lines 3—3 of Figure 6 showing the scoop in dumping position and illustrating the closure for the forward end of the said scoop in its open position.

Figure 4 is a front elevational view of the invention showing the hydraulic pistons arranged on each side thereof for operating the scoop.

Figure 5 is a perspective view of one of the couplings employed in securing the piston rod in each of the hydraulic piston and cylinder assemblies to the super-frame structure supporting the scoop.

Figure 6 is a plan view of the invention showing one side of the super-frame structure cut away and one hydraulic cylinder and piston assembly removed and illustrating the manner in which the wheels are arranged on the frame structure.

Figure 7 is a rear view of the actual frame structure and scoop member of the invention, taken on lines 7—7 of Figure 6, showing the latch assembly by which the scoop is retained in a carrying position, and Figure 8 fragmentarily shows the forward end of the main frame structure and illustrates portions cut away to show the hitch assembly and hydraulic conduits by which the hydraulic cylinder and piston assemblies are actuated.

Accordingly, therefore, the invention comprises a main frame assembly 10 consisting of parallel side members 11 connected across the front of the assembly by a transverse bar 12, as shown in Figures 3, 6 and 8. The frame assembly 10 is preferably of channel iron or hollow members which are rectangular in lateral section, as in Figure 3, and a hitch 13 is connected to the main frame assembly 10 through the medium of a tongue 14 suitably braced on each side by angular members 15 extending from the base of the hitch 13 to each forward corner of the main frame 10, in the manner illustrated in Figure 8. The hitch 13 is preferably of the swivel type enabling the device to move freely in its movement along rough or uneven terrain and be subject to a limited rotary motion.

Each of the parallel frame members 11 extend rearwardly of the invention and project inwardly toward each other, as illustrated particularly in Figure 6, to provide means for the arrangement of stub axles 16 thereon for wheels 17 which preferably have pneumatic tires. It is desirable, as will become manifest, that the wheels 17 operate within the cutting area of the invention, or in the path of the cutting members, and it will be noted, by reference to Figure 6, that the wheels are arranged well within the frame structure 10.

On each side of the frame structure 10 and supported thereon is a super-frame structure 18 which is substantially triangular in form and each has an L-shaped frame formed of right angular members 19 and 20 connected across their ends by an integral member 21, as particularly shown in Figures 1 and 2. The triangular super-frame structures thus provided are pivoted on the rear extremity of the frame structure 10 at a, the right-angular member 20 being substantially horizontal in operative position, while the right-angular member 19 thereof is substantially vertical when the scoop 22 supported by the super-frame structures 18 is in its carrying position, as shown in Figure 1. The lower front corners of the frame structures 18 have links 23 pivotally connected therewith at b and each has a slot c in which integral pins d slidably operate to permit only a limited vertical movement of the forward portion of the super-frame structures 18 with relation to the frame structure 10 of the invention, as illustrated in Figures 1 and 2. The pin d is integral with the lowest side of each of the side members 11 of the frame structure 10.

The scoop 22 is supported on each side by integral pins 24 journalled in bearings 25 integral with the members 20 of the super-frame structures 18. In its operative position shown in Figure 2 the scoop 22 is tilted forwardly by lowering the frame structures 18 on their pivots a so that the cutting blade 26 of the scoop 22 can be brought into engagement with the earth to pick up the soil in the forward movement of the tractor 27, fragmentarily shown in Figure 1. The super-frame structures 18 are operated on their pivots a by hydraulic pistons operating in cylinders 28 arranged forwardly of each frame member 18 and having their rods 29 connected at their upper ends through pivots 30 to the upper ends of the members 19 of the frame structures 18 in the manner shown in Figures 1 and 2.

In Figure 4 it will be noted that the rods 29 of the hydraulic pistons operating in the cylinders 28 are connected to the members 19 of the super-frame structures 18 through a T-shaped coupling 31, shown in detail in Figure 5, formed of tubing, or the like, and providing a transverse portion 32 through which the pins 30 are arranged to provide suitable pivots. The scoop 22 has its pivot 24 forwardly of the frames 18 and forwardly of its center of gravity so that rearwardly thereof the scoop 22 is supported on the members 20 of the frames 18 by integral lugs 33 on the ends of the scoop 22, as shown in Figures 1 and 2, so that in both the carrying position, illustrated in Figure 1, and the operative position, shown in Figure 2, the lugs 33 are always in contact with the members 20 of the frame structures 18, but in the dumping position, illustrated in Figure 3, the rear of the scoop 22 is raised so that the lugs 33 are well above the members 20 of the frame structures 18.

The hydraulic cylinders 28 are pivoted at their lower ends by pins 34 extending through integral brackets 35 on the forward ends of the side members 11 of the frame structure 10. Suitable hydraulic conduits 36 connect the cylinders 28 with the hydraulic pistons of the tractor 27 so that by the manipulation of the hydraulic mechanism of the tractor the pistons within the cylinders 28 are actuated to move the frame structures 18 upwardly and downwardly on their pivots a to cause the scoop 22 to function.

As apparent in Figures 2 and 7, lugs 37 are arranged on the back of the scoop 22 and on each end thereof and are engageable by depending dogs 38 integral with a shaft 39 extending transversely of the frame assembly 10 and pivoted at each end in integral brackets 40 on the super-frame structures 18. Intermediate the ends of the shaft 39 is an integral lever 41 which is suitably braced on each side to the shaft 39 by arcuate members 42. To the upper end of the lever 41 an operating cable 43 is connected while its opposite end (not shown) is connected in some manner to the tractor and in convenient reach of the operator so that the lever 41 can be manipulated by a pull on the cable 43 to disengage the dogs 38 from the lugs 37 to dump the contents of the scoop 22 when the same is in the position illustrated in Figure 3.

In its carrying position the scoop 22 is closed at its forward end by a closure member 44 conforming in shape to the scoop 22, as shown in Figures 1, 2 and 3, and is pivotally supported on the same pivot 24 as the scoop 22 is supported on the frame members 18, in the manner previously described. The forward end of the closure 44 is operatively supported on each of the side members 11 of the frame 10 by integral lugs 45 arranged on each end of the member 44, as shown in Figures 1 and 2, so that only a slightly rocking movement of the closure 44 is permitted. It will be noted, by reference to Figure 2, that the rear portion of the closure 44 moves downwardly only a short distance, pivoting on the lugs 45, when the scoop 22 is operated to its cutting or scraping position shown in Figure 2, or to the dumping position, illustrated in Figure 3.

Integral with the forward or closed side of the closure 44 is a lever 46 having a pull spring 47 connected at its upper end while the opposite end of the spring 47 is secured to a bracket 48 integral with the pole member 14 of the frame 10. The spring 47 aids in retaining the closure 44 in its operative position illustrated in Figure 1.

In operation, the hydraulic mechanism on the tractor is manipulated so as to cause the hydraulic pistons in the cylinders 28 to move downwardly to operate the frame structures 18 forwardly of the invention to tilt the scoop 22 so that its cutting blade 26 will engage the earth's surface, in the manner shown in Figure 2. As the assembly moves forward the scoop 22 will pick up the soil until its capacity is reached when the operator will again manipulate the hydraulic mechanism causing the pistons in the cylinders 28 to move upwardly and thus raise the frames 18 to cause the scoop 22 to assume the carrying position illustrated in Figure 1. The closure 44, by reason of the movement of the frames 18, will close the front of the scoop 22 and prevent spillage while the soil is being transported. When it is desired to empty the scoop 22 the cable 43 is manipulated to move the lever 41 forward on its pivot to partially rotate the shaft 39 to disengage the depending dogs 38 from the lugs 37 integral with the back of the scoop 22 and cause the same to assume the dumping position illustrated in Figure 3. In this operation the hydraulic mechanism is not employed, since the weight of the earth carried in the scoop 22 is sufficient to tilt the same forward to relieve its contents. The scoop 22 is manipulated back to its carrying position shown in Figure 1 by operating the hydraulic mechanism to move the pistons in the cylinders 28 upwardly, rocking the frame structures 18 rearwardly, in the manner previously described.

Manifestly, the structure herein shown and described is capable of considerable changes and modifications from time to time by persons skilled in the art without departing from the spirit and intent of the invention or the scope of the appended claims.

What is claimed is:

1. In a tractor-drawn earth moving device, in combination with a wheeled frame having a hitch, a sub-frame comprising a pair of L-shaped members pivotally connected to each side of said wheeled frame and having their horizontal legs operating in a vertical plane above said wheeled frame and extending forwardly of said pivotal connection and having their vertical legs extending upwardly from the forward ends of said horizontal legs, an earth scoop pivotally supported between said horizontal members of said sub-frame and adapted to be operatively raised and lowered thereby, a closure for said scoop operatively connected on said second-named pivotal connection and operating with said scoop, hydraulic means operated from said tractor and having connection with the vertical legs of said L-shaped members actuating said sub-frame, and releasable latching means retaining said scoop and closure in carrying position.

2. In a hydraulic scoop for tractors, or the like, in combination with a main frame structure having a tractor hitch and a pair of wheels rearwardly thereof, a super-frame structure arranged on each side of said main frame, each comprising L-shaped members having one of their legs operative substantially in a vertical plane and parallel to the sides of said main frame and having a pivotal connection therewith on the rear extremity thereof, and the other one of the legs of the L-shaped members arranged substantially vertical forwardly of said pivotal connection with said main frame, a scoop pivotally connected to the said horizontal legs and capable of having its forward scraping edge tilted and lowered by the pivotal action of said super-frame, hydraulic means supported on said main frame and operated from said tractor for operating said super-frame to actuate said scoop, a closure for the forward open side of said scoop and pivoted therewith in operation and having a pivotal support on said super-frame forwardly of said scoop, and means for releasing said scoop to empty the same.

OTTO J. WARREN.
VALTON W. HAIR.

References Cited in the file of this patent

UNITED STATES PATENTS

| Number | Name | Date |
|---|---|---|
| 2,219,478 | Gurries | Oct. 29, 1940 |
| 2,227,433 | Berner | Jan. 7, 1941 |
| 2,271,791 | Clark | Feb. 3, 1942 |
| 2,329,210 | McGee | Sept. 14, 1943 |
| 2,386,192 | Brimhall | Oct. 9, 1945 |
| 2,445,260 | Brimhall | July 13, 1948 |